(12) United States Patent
Claar et al.

(10) Patent No.: US 7,288,582 B2
(45) Date of Patent: Oct. 30, 2007

(54) COLORED COMPOSITIONS WITH SUBSTRATE-HIDING MATERIALS

(75) Inventors: James A. Claar, Apollo, PA (US); Robert E. Jennings, Ellwood City, PA (US); Calum Hugh Munro, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 576 days.

(21) Appl. No.: 10/818,550

(22) Filed: Apr. 5, 2004

(65) Prior Publication Data

US 2005/0228090 A1    Oct. 13, 2005

(51) Int. Cl.
*C08K 5/34* (2006.01)
(52) U.S. Cl. .................. 524/88; 523/218; 524/190; 524/431; 524/497
(58) Field of Classification Search .............. 523/218; 524/88, 190, 431, 497
See application file for complete search history.

(56) References Cited

U.S. PATENT DOCUMENTS

| | | | |
|---|---|---|---|
| 3,253,146 A | 5/1966 | de Vries | 250/71 |
| 4,517,320 A | 5/1985 | Bäbler et al. | 523/215 |
| 5,030,669 A | 7/1991 | Hendrickson et al. | 523/333 |
| 5,034,084 A | 7/1991 | Schäfer et al. | 156/278 |
| 5,106,533 A | 4/1992 | Hendrickson et al. | 252/314 |
| 5,201,929 A | 4/1993 | Mizuno et al. | 65/142 |
| 5,201,948 A | 4/1993 | Fasano et al. | 106/311 |
| 5,294,237 A | 3/1994 | Mizuno et al. | 65/21.1 |
| 5,334,297 A | 8/1994 | Nakada et al. | 204/181.2 |
| 5,538,548 A | 7/1996 | Yamazaki | 106/20 C |
| 5,538,549 A | 7/1996 | Kato et al. | 106/20 C |
| 5,716,435 A | 2/1998 | Aida et al. | 106/31.85 |
| 5,837,041 A | 11/1998 | Bean et al. | 106/31.6 |
| 5,902,711 A | 5/1999 | Smith et al. | 430/137 |
| 5,942,027 A | 8/1999 | Ikai et al. | 106/31.33 |
| 5,990,219 A | 11/1999 | Sakai et al. | 524/441 |
| 6,030,440 A | 2/2000 | Sekioka et al. | 106/31.65 |
| 6,031,024 A | 2/2000 | Uraki et al. | 523/161 |
| 6,099,627 A | 8/2000 | Saibara et al. | 106/31.33 |
| 6,153,001 A | 11/2000 | Suzuki et al. | 106/31.65 |
| 2003/0125417 A1 | 7/2003 | Vanier et al. | 523/171 |

FOREIGN PATENT DOCUMENTS

| | | |
|---|---|---|
| JP | 03114574 | 5/1991 |
| JP | 05007830 | 1/1993 |
| JP | 06306313 | 11/1994 |
| JP | 11197592 | 7/1999 |
| WO | WO95/19399 | 7/1995 |

*Primary Examiner*—Edward J. Cain
(74) *Attorney, Agent, or Firm*—Donald R. Palladino; Carole A. Marmo

(57) ABSTRACT

Compositions are disclosed. The compositions include a binder, a transparent or semi-transparent colorant having an average particle diameter of greater than 150 nanometers; and at least one member comprising a scattering pigment dispersed in a matrix. Substrates coated with such compositions and methods of coating substrates with such compositions are also disclosed.

48 Claims, 1 Drawing Sheet

COLORED COMPOSITIONS WITH SUBSTRATE-HIDING MATERIALS

FIELD OF THE INVENTION

The present invention relates to compositions, such as coating compositions, which include a binder, a transparent or semi-transparent colorant, and a scattering member that includes a scattering agent dispersed in a matrix. The present invention also relates to methods of making such compositions, methods of coating a substrate with such compositions, and substrates coated with such compositions.

BACKGROUND INFORMATION

Paints typically include colorants, such as pigments or dyes, dispersed in a binder. In many cases, the colorants are transparent or semi-transparent pigments, such as is often the case with certain reds, yellows and oranges. While such colorants are often desired, one problem that may arise from their use is that they may not adequately "hide" the substrate upon which the paint is deposited. This is often the case because the index of refraction of such colorants is similar to that of the binder in which the colorant is dispersed. As a result, such colorants scatter little or no light, so that light more easily reaches the substrate. To solve this hiding problem, the film thickness and/or the amount of colorant in the paint may be increased. Both of these solutions, however, can be costly because, at least in part, of the relatively high cost of colorants.

Another known way to improve the hiding ability of a paint composition is to include substrate-hiding materials, such as titanium dioxide, zinc oxide, and/or lead oxide, in the paint composition. Of these, titanium dioxide is most often used by paint manufacturers. These materials, sometimes referred to as "opacifying pigments," usually have an optimal particle diameter of around 200 nanometers and a refractive index that is significantly higher than that of the binder in which the material is dispersed. As a result, they provide whiteness and are good hiding pigments.

The use of these white hiding pigments, however, has not been without drawbacks. Typically, particles of hiding pigments, such as titanium dioxide, are randomly dispersed in the binder along with the coloring pigment. To achieve sufficient hiding, however, sufficient levels of hiding pigment must be used so that there is a statistical probability that light will be scattered by particles of hiding pigment before reaching the substrate. As a result, a significant amount of hiding pigment may reside at or near the top surface of the coating film, away from the substrate. In such a case, a significant amount of light may be reflected by the white hiding pigment without ever passing through the colorant, thereby affecting the chromaticity, or purity, of the paint color.

It has been proposed to include in a coating a flake-like assemblage in which scattering pigments are encapsulated in a resinous polymer. U.S. Patent Application Publication No. 2003/0125417A1 discloses that when such assemblages are included in a paint composition and the paint is applied to a substrate, the assemblages tend to align with the substrate and with each other in parallel along their longest dimensions to create multidirectional scattering of light in the paint composition. The coatings of this application, however, are directed to the use of specially processed colorants having a primary particle size of less than about 150 nanometers dispersed in a resinous binder. Such colorants are, however, often undesireable because, for example, they require extra processing to produce, are costly, and they are less commercially available as compared to conventional colorants, which have an average particle diameter of greater than 150 nanometers. In addition, the use of colorants having a primary particle size of less than about 150 nanometers may be especially undesirable in certain applications because of metamerism effects. Metamerism is caused by the nature of human color vision and results from the fact that two colored articles may appear the same color under illumination with a given light source, even though they may have differences in their reflection spectra. Because of these differences, these same articles may appear different from each other in color under a different light source. This can be particularly problematic because, for example, a refinish paint composition could appear to match an original automotive paint when indoors but fail to match outdoors. Because most original automotive paints contain conventionally sized pigments as colorants, it is particularly desirable to provide refinish paint compositions that with good hiding and color purity that also use conventionally sized pigment particles.

Accordingly, there is a need for improved pigmented compositions that use conventionally sized transparent or semi-transparent colorants, and which can (i) exhibit improved hiding as compared to coatings that include such transparent or semi-transparent pigments in the absence of any substrate-hiding materials, and (ii) exhibit improved color purity as compared to coatings that include dispersed transparent or semi-transparent pigments and substrate-hidings materials.

SUMMARY OF THE INVENTION

In one respect, the present invention relates to compositions, such as coating compositions, that comprise (a) a binder; (b) a transparent or semi-transparent colorant comprising particles having an average particle diameter of greater than 150 nanometers; and (c) a scattering member comprising a scattering agent dispersed in a matrix.

In another respect, the present invention relates to substrates having a composition deposited thereon. Such substrates have deposited thereon a composition comprising (a) a binder; (b) a transparent or semi-transparent colorant comprising particles having an average particle diameter of greater than 150 nanometers; and (c) a scattering member comprising a scattering agent dispersed in a matrix.

In yet another respect, the present invention relates to methods of coating a substrate. The method comprises the steps of (a) applying a composition to a surface of the substrate to form a substantially continuous film over at least a portion of the substrate, and (b) curing the composition. The composition comprises (1) a binder; (2) a transparent or semi-transparent colorant comprising particles having an average particle diameter of greater than 150 nanometers; and (3) a scattering member comprising a scattering agent dispersed in a matrix.

DETAILED DESCRIPTION OF EMBODIMENTS OF THE INVENTION

Figure 1:
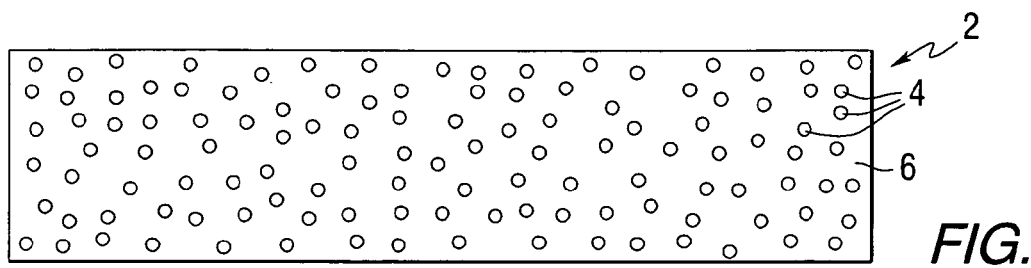
FIGS. 1 to 6 are cross sections of scattering members in accordance with certain embodiments of the present invention.

For purposes of the following detailed description, it is to be understood that the invention may assume various alternative variations and step sequences, except where expressly specified to the contrary. It is also to be understood that the specific devices and processes are simply exemplary embodiments of the invention. Hence, specific dimensions and other physical characteristics related to the embodiments disclosed herein are not to be considered as limiting. Moreover, other than in any operating examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

It should also be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

The present invention is directed to compositions, such as coating compositions, comprising: (a) a binder; (b) a transparent or semi-transparent colorant comprising particles having an average particle diameter of greater than 150 nanometers; and (c) a scattering member comprising a scattering agent dispersed in a matrix.

The compositions of the present invention include at least one colorant that is transparent or semi-transparent. As used herein, the phrase "transparent or semi-transparent colorant" refers to colorant, such as pigments, with a haze of at least about 5%. In certain embodiments of the present invention, the transparent or semi-transparent pigment has a haze of 5 up to 55%, or, in other embodiments, greater than 10 up to 55%. Haze is a measurement of the transparency of a material and is defined by ASTM D1003. The haze values described herein are determined with a Byk-Gardner TCS (The Color Sphere) instrument having a 500 micron cell path length on colorants dispersed in butyl acetate. Because the % haze of a liquid sample is concentration dependent, we specify herein the % haze at a transmittance of about 15% to about 20% at the wavelength of maximum absorbance.

In the compositions of the present invention, the transparent or semi-transparent colorant comprises particles having an average particle diameter of greater than 150 nanometers or, in some cases, greater than 150 nanometers up to about 500 nanometers. As will be appreciated by those skilled in the art, colorant particles of such size often provide the best compromise of opacity, color, gloss, and distinctness of image ("DOI") for paint compositions.

In certain embodiments of the present invention, the transparent or semi-transparent colorant has a refractive index that is greater than or less than that of the binder by an amount less than about 0.5 (or, in some cases, less than about 0.3) at the wavelength where the greatest difference in refractive index between the colorant and the binder is observed.

Suitable transparent or semi-transparent colorants that may be used in the present invention include, for example, both inorganic and organic pigments and mixtures thereof. Suitable transparent or semi-transparent inorganic pigments include, for example, titanium dioxide, electrically conductive titanium dioxide, and iron oxides, e.g., red iron oxide, yellow iron oxide, orange iron oxide and transparent iron oxides.

Examples of transparent or semi-transparent organic pigments that may be used in the compositions of the present invention include, but are not limited to, azo (such as monoazo, diazo, □-naphthol, naphthol AS, salt type (lakes), benzimidazolone, condensation, metal complex, isoindolinone, and isoindoline) and polycyclic (such as phthalocyanine, quinacridone, perylene, perinone, diketopyrrolo pyrrolo, thioindigo, anthraquinone, indanthrone, anthrapyrimidine, flavanthrone, pyranthrone, anthanthrone, dioxazine, triarylcarbonium, and quinophthalone) pigments, and mixtures thereof. The pigment particles may, for example, be non-agglomerated. According to certain particular embodiments of the present invention, the aforementioned semi-transparent pigments have a color that is, for example, yellow, or, for example, red, or, for example, orange.

In certain embodiments of the present invention, the transparent or semi-transparent colorant is present in the composition in an amount of 2 up to 70 percent by weight, or, in some cases, 2 up to 40 percent by weight, or, in yet other cases, 2 up to 25 percent by weight based on the total weight of the composition. The amount of colorant present in the composition may range between any combination of these values, inclusive of the recited values.

The compositions of the present invention include at least one scattering member comprising a scattering agent dispersed in a matrix. In certain embodiments of the present invention, the scattering member is in the form of a platelet, an example of which is shown in FIG. 1. As used herein, "platelet" refers to a structure that has an aspect ratio of at least about 2, wherein "aspect ratio" is determined as follows:

$$\text{Aspect Ratio} = \frac{\text{Width Of The Member}}{\text{Thickness Of The Member}}$$

Referring to FIG. 1, there is seen a scattering member 2 in the form of a platelet. In certain embodiments of the present invention, the platelet has an aspect ratio of about 2 up to 400 or, in some cases, greater than 5, or greater than 10. In certain embodiments of the present invention, the platelet has a thickness of 0.05 up to 10 micrometers or, in certain embodiments, 0.5 up to 5 micrometers. Moreover, in certain embodiments of the present invention, the scattering member has a width of 10 up to 150 micrometers or, in some cases, 20 up to 30 micrometers.

As is apparent in FIG. 1, the scattering member 2 comprises a scattering agent 4 dispersed in matrix 6. As used herein, the term "scattering agent" includes substrate-hiding materials or "opacifying pigments," such as any of those known to those skilled in the art. Examples include, without limitation, titanium dioxide, zinc oxide, lead oxide, air voids and mixtures thereof. In certain embodiments of the present invention, the volume ratio of the scattering agent 4 to the matrix 6 is about 1:10 to about 10:1. The scattering agent particles may, in certain embodiments of the present invention, be coated with a passivating layer of silica or alumina.

When the compositions of the present invention are applied to a substrate, the one or more scattering members may tend to align with the substrate and with each other in parallel along their longest dimensions to create multidirectional scattering of light in the paint composition, providing hiding. Moreover, the scattering members may also tend to migrate towards the substrate and away from the top surface of the film so that the scattering agent scatters little or no light that has yet to encounter the transparent or semi-transparent colorant.

In certain embodiments of the present invention, the scattering agent comprises particles having an average particle diameter of about 200 to about 300 nanometers or, in some cases, about 200 up to about 250 nanometers. Moreover, in certain embodiments of the present invention, the difference in refractive index between the scattering agent 4 and the matrix 6 is at least about 0.5 or, in some cases, at least about 1.0 at the wavelength where the minimum difference in refractive index between the scattering agent and the matrix is observed.

As used herein, the term "matrix" refers to any continuous material in which something is enclosed or embedded. In certain embodiments of the present invention, the matrix 6 comprises a polymer. Polymers that are suitable for use in the matrix in the compositions of the present invention include, for example, acrylic polymers, polyester polymers, polyurethane polymers, and polyether polymers, among others.

In certain particular embodiments of the present invention, the matrix comprises an inorganic material. Such embodiments may be preferred in some cases because, for example, they can often result in the formation of a smoother film as compared to cases wherein the matrix comprises a polymer. In certain embodiments, the matrix comprises a material derived from a silica sol. In particular, in certain embodiments, the matrix comprises a glass flake as that term is used in U.S. Pat. No. 5,201,929, col. 5, lines 27-29, which is incorporated herein by reference. Such flakes may, for example, have a thickness of 0.05 to 10 µm, such as 0.05 to 5 µm. Scattering members having a matrix comprising an inorganic material that are suitable for use in the compositions of the present invention, as well as methods and apparatuses for their production, are described in U.S. Pat. Nos. 5,201,929 and 5,294,237, at col. 2, line 28 to col. 6, line 27 and col. 9, line 60 to col. 7, line 18, both of which are incorporated herein by reference. An example of such materials is LTSG30A, available from Nippon Glass Sheet, Osaha, Japan.

Figure 2:
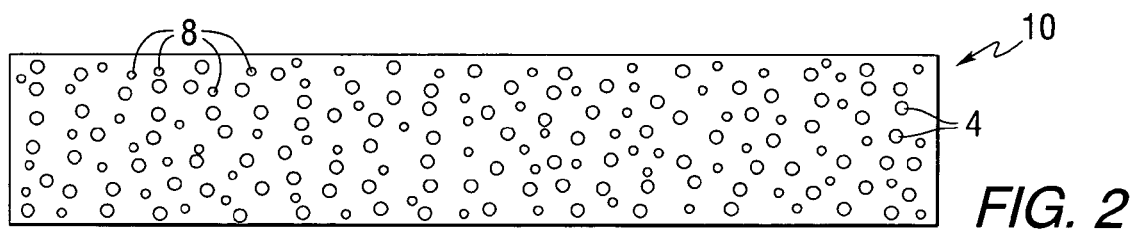

In certain embodiments of the present invention, shown in FIG. 2, the scattering member 10 includes the scattering agent 4 dispersed in matrix 6. Also dispersed in matrix 6 is a visible light absorbing pigment 8. As used herein, "visible light absorbing pigment" refers to a pigment that absorbs light at the visible wavelengths, about 380 to 720 nanometers. In certain embodiments of the present invention, the visible light absorbing pigment is carbon black pigment, such as, for example, that which is specified in ASTM D561-82.

Figure 3:
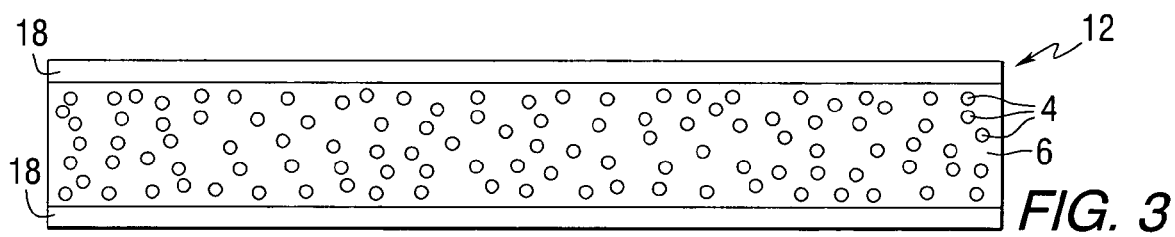

In certain other embodiments of the present invention, shown in FIG. 3, the scattering member 12 includes the scattering agent 4 dispersed in matrix 6. An additional colorant layer 18 is also provided on each surface of the matrix 6. The total thickness of the colorant layers 18 may, in certain embodiments of the invention, be about 2 percent to about 90 percent of the thickness of the total scattering member 12. The colorant layers 18 may include colorant particles (not shown) dispersed in a resinous polymer. The colorant particles may, for example, be the same colorant as the transparent or semi-transparent colorant included in the composition as described above. In such a case, by including the colorant layer 18 adjacent to the matrix 6, light which reaches the scattering agent 4 necessarily has passed through a region containing the transparent or semi-transparent colorants of the compositions of the present invention. This further increases the likelihood that light scattered from the scattering member 12 will have been subjected to the light absorbance of the transparent or semi-transparent colorant.

Figure 4:
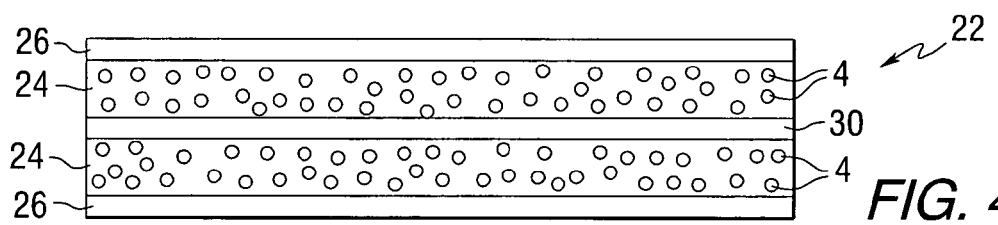
Figure 5:
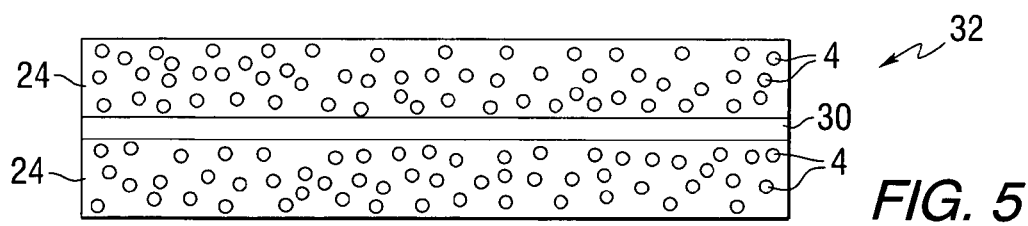

In yet other embodiments of the present invention, shown in FIG. 4, the scattering member 22 includes a pair of layers 24 including the scattering agent 4 dispersed in the matrix 6. Layers 26 of colorant cover the layers 24. Intermediate to the layers 24 is a layer 30 containing dark pigments (not shown). The dark colored layer 30 absorbs that light which may be forward scattered by the scattering agent 4. Alternatively, a scattering member 32 shown in FIG. 5 may include the layers 24 and 30 without the outer layers 26.

Figure 6:
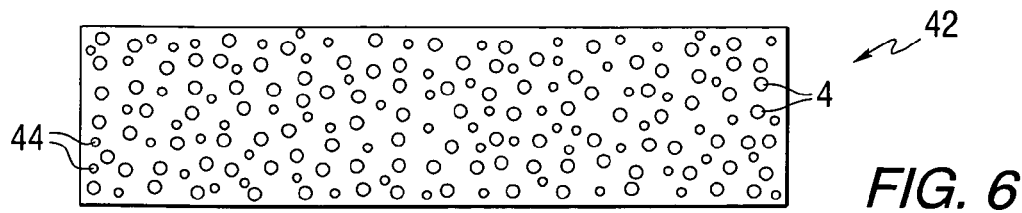

Yet another embodiment of a scattering member that may be used in the present invention is shown in FIG. 6. Here, scattering member 42 includes the scattering agent 4 dispersed in the matrix 6. Also dispersed in the matrix 6 are filler materials 44, such as silica, which serve to maintain the scattering agent particles 4 spaced apart from each other. In certain embodiments of the present invention, the scattering members 4 have a diameter of about 200 to 300 nanometers (as mentioned above) and the filler particles 44 are about 150 nanometers in diameter. When the filler particles 44 are silica, which has a refractive index of about 1.46, the filler particles 44 may increase the difference in refractive index between the binder with silica and the scattering agent 4.

The compositions of the present invention also include a binder. In certain embodiments of the present invention, the binder is a polymeric composition. Binders that may be used in the compositions of the present invention include, for example, those that are conventionally used in automotive OEM coating compositions, automotive refinish coating compositions, industrial coating compositions, architectural coating compositions, electrocoating compositions, powder coating compositions, coil coating compositions, and aerospace coating compositions, among others.

Polymeric compositions that are suitable for use as the binder in the compositions described herein may be thermoplastic or thermosetting. As used herein, by "thermosetting" is meant a polymeric composition that "sets" irreversibly upon curing or crosslinking, wherein the polymer chains of the polymeric components are joined together by covalent bonds. This property is usually associated with a cross-linking reaction of the composition constituents often induced, for example, by heat or radiation. See Hawley, Gessner G., The Condensed Chemical Dictionary, Ninth Edition., page 856; Surface Coatings, vol. 2, Oil and Colour Chemists' Association, Australia, TAFE Educational Books (1974). Curing or crosslinking reactions also may be carried out under ambient conditions. Once cured or crosslinked, a thermosetting resin will not melt upon the application of heat and is insoluble in solvents. By contrast, "thermoplastic" polymeric compositions comprise polymeric components that are not joined by covalent bonds and thereby can undergo liquid flow upon heating and are soluble in solvents. See Saunders, K. J., Organic Polymer Chemistry, pp. 41-42, Chapman and Hall, London (1973).

Suitable binders include, without limitation, hydroxyl or carboxylic acid-containing acrylic copolymers, and hydroxyl or carboxylic acid-containing polyester polymers and oligomers and isocyanate or hydroxyl-containing polyurethane polymers, or amine or isocyanate-containing polyureas.

The acrylic polymers, if used, are typically copolymers of acrylic acid or methacrylic acid or hydroxyalkyl esters of acrylic or methacrylic acid such as hydroxyethyl methacrylate or hydroxypropyl acrylate with one or more other polymerizable ethylenically unsaturated monomers such as alkyl esters of acrylic acid including methyl methacrylate and 2-ethyl hexyl acrylate, and vinyl aromatic compounds such as styrene, alpha-methyl styrene and vinyl toluene. The ratio of reactants and reaction conditions are selected to result in an acrylic polymer with pendant hydroxyl or carboxylic acid functionality.

Besides acrylic polymers, the curable coating composition of the present invention can contain a polyester polymer or oligomer. Such polymers may be prepared in a known manner by condensation of polyhydric alcohols and polycarboxylic acids. Suitable polyhydric alcohols include ethylene glycol, neopentyl glycol, trimethylol propane and pentaerythritol.

Suitable polycarboxylic acids include adipic acid, 1,4-cyclohexyl dicarboxylic acid and hexahydrophthalic acid. Besides the polycarboxylic acids mentioned above, functional equivalents of the acids such as anhydrides where they exist or lower alkyl esters of the acids such as the methyl esters may be used. Also, small amounts of monocarboxylic acids such as stearic acid may be used.

Hydroxyl-containing polyester oligomers can be prepared by reacting an anhydride of a dicarboxylic acid such as hexahydrophthalic anhydride with a diol such as neopentyl glycol in a 1:2 molar ratio.

Where it is desired to enhance air-drying, suitable drying oil fatty acids may be used and include, for example, those derived from linseed oil, soya bean oil, tall oil, dehydrated castor oil or tung oil, among others.

The polyesters are made to contain free terminal hydroxyl and/or carboxyl groups that are available for further crosslinking reactions.

Polyurethane polymers containing terminal isocyanate or hydroxyl groups may also be used. The polyurethane polyols or NCO-terminated polyurethanes that can be used are those prepared by reacting polyols including polymeric polyols with polyisocyanates. The polyurea-containing terminal isocyanate or primary or secondary amine groups which can be used are those prepared by reacting polyamines including polymeric polyamines with polyisocyanates. The hydroxyl/isocyanate or amine/isocyanate equivalent ratio is adjusted and reaction conditions selected to obtain the desired terminal group. Examples of suitable polyisocyanates are those described in U.S. Pat. No. 4,046,729 at column 5, line 26 to column 6, line 28, hereby incorporated by reference. Examples of suitable polyols are those described in U.S. Pat. No. 4,046,729 at column 7, line 52 to column 10, line 35, hereby incorporated by reference. Examples of suitable polyamines are those described in U.S. Pat. No. 4,046,729 at column 6, line 61 to column 7, line 32 and in U.S. Pat. No. 3,799,854 at column 3, lines 13 to 50, both hereby incorporated by reference.

Suitable curing agents for curable coating compositions include aminoplast resins and phenoplast resins and mixtures thereof, as curing agents for OH and COOH, and amide and carbamate functional group containing materials. Examples of aminoplast and phenoplast resins suitable as curing agents in the curable compositions of the present invention are those described in U.S. Pat. No. 3,919,351 at col. 5, line 22 to col. 6, line 25, hereby incorporated by reference.

Polyisocyanates and blocked polyisocyanates as curing agents for OH and primary and/or secondary amino group containing materials are well known in the art. Examples of polyisocyanates and blocked isocyanates suitable for use as curing agents in the curable compositions of the present invention are those described in U.S. Pat. No. 4,546,045 at col. 5, lines 16 to 38; and in U.S. Pat. No. 5,468,802 at col. 3, lines 48 to 60, both hereby incorporated by reference.

Anhydrides as curing agents for OH and primary and/or secondary amino group containing materials are well known in the art. Examples of anhydrides suitable for use as curing agents in the curable compositions of the present invention are those described in U.S. Pat. No. 4,798,746 at col. 10, lines 16 to 50; and in U.S. Pat. No. 4,732,790 at col. 3, lines 41 to 57, both hereby incorporated by reference.

Polyepoxides as curing agents for COOH functional group containing materials are well known in the art. Examples of polyepoxides suitable for use as curing agents in the curable compositions of the present invention are those described in U.S. Pat. No. 4,681,811 at col. 5, lines 33 to 58, hereby incorporated by reference.

Polyacids as curing agents for epoxy functional group containing materials are well known in the art. Examples of polyacids suitable for use as curing agents in the curable compositions of the present invention are those described in U.S. Pat. No. 4,681,811 at col. 6, line 45 to col. 9, line 54, hereby incorporated by reference.

Polyols, that is, material having an average of two or more hydroxyl groups per molecule, can be used as curing agents for NCO functional group containing materials and anhydrides and esters and are well known in the art. Examples of said polyols are those described in U.S. Pat. No. 4,046,729 at col. 7, line 52 to col. 8, line 9; col. 8, line 29 to col. 9, line 66; and in U.S. Pat. No. 3,919,315 at col. 2, line 64 to col. 3, line 33, both hereby incorporated by reference.

Polyamines can also be used as curing agents for NCO functional group containing materials and for carbonates and unhindered esters and are well known in the art. Examples of polyamines suitable for use as curing agents in the curable compositions of the present invention are those described in U.S. Pat. No. 4,046,729 at col. 6, line 61 to col. 7, line 26, hereby incorporated by reference.

In accordance with certain embodiments of the present invention, the binder is present in the composition in an amount of 30 up to 98 percent by weight, or, in some cases, 60 up to 98 percent by weight, or 75 up to 98 percent by weight based on the total weight of the composition. The amount of binder present in the composition may range between any combination of these values, inclusive of the recited values.

The compositions of the present invention can also contain, in addition to the components described above, a variety of other adjuvant materials. If desired, other resinous materials can be utilized in conjunction with the resinous binder so long as the resultant coating composition is not detrimentally affected in terms of application, physical performance and appearance properties.

The compositions of the present invention can also may contain a catalyst to accelerate the cure reaction, examples of suitable catalysts include organotin compounds such as dibutyl tin dilaurate, dibutyl tin oxide and dibutyl tin diacetate. Catalysts suitable for promoting the cure reaction between an aminoplast curing agent and the reactive hydroxyl and/or carbamate functional groups of the thermosettable dispersion include acidic materials, for example, acid phosphates such as phenyl acid phosphate, and substituted or unsubstituted sulfonic acids such as dodecylbenzene sulfonic acid or paratoluene sulfonic acid.

Other additive ingredients that may be used in the compositions of the present invention include those which are well known in the art of formulating surface coatings, such as surfactants, flow control agents, thixotropic agents, fillers, anti-gassing agents, organic co-solvents, catalysts, and other customary auxiliaries. Examples of these materials and suitable amounts are described in U.S. Pat. Nos. 4,220,679, 4,403,003, 4,147,769 and 5,071,904, which are incorporated herein by reference.

The compositions of the present invention may be used as a coating, such as a single coating, a clear top coating, a base coating in a two-layered system, or as layers of a multi-layered system including a clear top coating composition, colorant layer and base coating composition, or as a primer layer. The compositions of the present invention may exhibit improved hiding as compared to coatings containing transparent or semi-transparent colorants without any substrate-hiding materials, while exhibiting improved chromaticity as compared to coatings that include randomly dispersed transparent or semi-transparent colorants and substrate-hidings materials.

The present invention is also directed to substrates having the compositions described herein deposited thereon. The compositions of the present invention can be applied over virtually any substrate including wood, metals, glass, cloth, plastic, foam, including elastomeric substrates and the like.

The present invention is also directed to methods of coating substrates with the compositions described herein. The methods of coating substrates in accordance with the present invention comprise (a) applying the compositions described herein to a surface of the substrate to form a substantially continuous film over at least a portion of the substrate, and (b) curing the composition. The compositions of the present invention can be applied to the substrate by any conventional coating technique such as brushing, spraying, dipping or flowing, but they are most often applied by spraying. The usual spray techniques and equipment for air spraying, airless spray and electrostatic spraying in either manual or automatic methods can be used.

In certain embodiments of the present invention, the compositions described herein may be applied to the substrate such that a dry film thickness of at least 0.5 mils (at least 12.7 microns), or, in some cases 0.5 to 20 mils (12.7 to 508 microns) is achieved.

Illustrating the invention are the following examples, which, however, are not to be considered as limiting the invention to their details. Unless otherwise indicated, all parts and percentages in the following examples, as well as throughout the specification, are by weight.

EXAMPLE 1

Composition with Scattering Member Having Titanium Dioxide Dispersed in an Organic Matrix This Example describes the preparation of a composition that includes a binder, an organic red pigment comprising particles having an average particle diameter of greater than 150 nanometers, and a scattering member comprising titanium dioxide particles dispersed in polymeric matrix.

A scattering member was produced as follows. First, a composition comprising a dispersion of titanium dioxide in acrylic monomers was prepared via the following procedure. 2184 grams of Ti-Pure R-706 titanium dioxide pigment available from available from E. I. duPont de Nemours and Co., Inc. and 16.8 grams of cellulose acetate butyrate from Sigma-Aldrich Company, Milwaukee, Wis., were dispersed using a rotary stirrer, fitted with a 2.5 inch diameter cowles blade, at 1100 revolutions per minute, in 449.4 grams of 1,4-butanediol diacrylate, 223.86 grams of pentaerythritol tetraacrylate, 225.54 grams of ethoxylated (4) pentaerythritol tetraacrylate, all available from Sartomer Company, Exton, Pa. and 50.4 g of acrylic acid available from Sigma-Aldrich Company, Milwaukee, Wis. To the mixture was added a further 273.0 grams of pentaerythritol tetraacrylate available from Sartomer, 33.6 grams of cellulose acetate butyrate available from Sigma-Aldrich and 302.4 grams of n-butyl acetate.

Next, an ultraviolet radiation curable composition was prepared via the following procedure. 166 grams of n-butyl acetate and 5.1 grams of diphenyl(2,4,6-trimethylbenzoyl) phosphine oxide/2-hydroxy-2-methylpropiophenone 50/50 blend available from Sigma-Aldrich were added to 500 grams of the dispersion of titanium dioxide in acrylic monomers described above. The mixture was filtered using a 5 micron nylon filter bag. 500 grams of the resultant composition was applied via a slot-die coater from Frontier Technologies, Towanda, Pa. to a polyethylene terephthalate substrate and dried at 150° F. for 12 seconds and then ultraviolet radiation cured using a 100 W mercury lamp.

The hardened film was then removed from the polyethylene terephthalate substrate. The hardened free film was processed into a fine powder by dry milling with a model ZM100 centrifugal mill (18,000 rpm) fitted with a 12 tooth stainless steel rotor and a 250 micron stainless steel screen, from Retsch GmbH and Co. KG, Haan, Germany.

A pigmented composition was then prepared by adding the fine powder produced above to a vessel containing a liquid quantity of D717, an organic red toner available from PPG Industries, Inc. as one component of a two-component binder system. The powder was dispersed within the binder by agitating the contents at moderate to high speed with a Cowles blade for 30 minutes to ensure complete wetting of the powder. After completing the dispersing phase, the second binder component, DCX61 (a crosslinking package available from PPG Industries, Inc.) and a reducer, DT870 (a solvent reducer package available from PPG Industries, Inc.) were added just prior to application of the composition to the substrate. Table 1 sets forth the amounts of each component in the pigmented composition of Example 1.

TABLE 1

| Component | Amount | Solids |
|---|---|---|
| D717 | 55.78% | 28.56% |
| Fine powder | 1.57% | 1.57% |
| DCX61 | 11.77% | 9.87% |
| DT870 | 30.88% | 0.00% |

EXAMPLE 2

Composition with Scattering Member Comprising Titanium Dioxide Dispersed in a Matrix Comprising an Inorganic Material This Example describes the preparation of a composition that includes a binder, an organic red pigment comprising particles having an average particle diameter of greater than 150 nanometers, and a scattering member comprising titanium dioxide particles dispersed in a matrix derived from a silica sol.

The composition was prepared by adding dry flake LTSG30A (titanium dioxide dispersed in a silica sol available from Nippon Sheet Glass, Osaka, Japan) to a vessel containing a liquid quantity of D717 as one component of a two component binder system. The dry flake was dispersed within the binder by agitating the contents at moderate to high speed with a Cowles blade for 30 minutes to ensure complete wetting of the powder. After completing the dispersing phase, the second binder component, DCX61, and a reducer, DT870, were added just prior to application of the composition to the substrate. Table 2 sets forth the amounts of each component in the pigmented composition of Example 2.

TABLE 2

| Component | Amount | Solids |
| --- | --- | --- |
| D717 | 55.78% | 28.56% |
| LTSG30A | 1.57% | 1.57% |
| DCX61 | 11.77% | 9.87% |
| DT870 | 30.88% | 0.00% |

COMPARATIVE EXAMPLE 3

Composition with Dispersed Titanium Dioxide

This Example describes the preparation of a composition that includes a binder, an organic red pigment comprising particles having an average particle diameter of greater than 150 nanometers, and titanium dioxide particles.

The composition was prepared by adding dry pigment R-902-38 (titanium dioxide available from available from DuPont de Nemours Company, Wilmington, Del.) to a vessel containing a liquid quantity of D717 as one component of a two-component binder system. The dry pigment was dispersed within the binder by agitating the contents at moderate to high speed with a Cowles blade for 30 minutes to ensure complete wetting of the powder. After completing the dispersing phase, the second binder component, DCX61, and a reducer, DT870, were added just prior to application of the composition to the substrate. Table 3 sets forth the amounts of each component in the pigmented composition of Comparative Example 3.

TABLE 3

| Component | Amount | Solids |
| --- | --- | --- |
| D717 | 55.78% | 28.56% |
| R-902-38 | 1.57% | 1.57% |
| DCX61 | 11.77% | 9.87% |
| DT870 | 30.88% | 0.00% |

COMPARATIVE EXAMPLE 4

Composition with No Titanium Dioxide

This Example describes the preparation of a composition that includes a binder and an organic red pigment comprising particles having an average particle diameter of greater than 150 nanometers.

The composition was prepared from a liquid quantity of D717, DCX61, and DT870. The DCX61 and DT870 were added just prior to application of the composition to the substrate. Table 4 sets forth the amounts of each component in the pigmented composition of Comparative Example 4.

TABLE 4

| Component | Amount | Solids |
| --- | --- | --- |
| D717 | 58.06% | 29.72% |
| DCX61 | 12.25% | 10.28% |
| DT870 | 29.69% | 0.00% |

The compositions of Examples 1 and 2 and Comparative Examples 3 and 4 were spray applied over flat panel metal substrates. Each panel had a self-adhering hiding label, Form M33, available from Leneta Company, Mahwah, N.J., affixed to its surface. The compositions were determined to have accomplished a wet hiding when the black and white squares on the hiding label were not visibly distinguishable.

After hiding was achieved, the coated panels were flashed for 30 minutes and then over baked for 30 minutes at 60° C. After cooling, the coated panels were measured for film thickness with a PERMASCOPE MMS, supplied by Fischer Technology, Windsor, Conn. Inc. The recorded film thicknesses in Table 5 below reflect the coating thickness needed to provide hiding for each Example composition. As is apparent, the compositions of Examples 1 and 2, as well as Comparative Example 3, achieved hiding at significantly lower dry film thicknesses than Comparative Example 4.

The CIE color of the panels was measured by a Minolta CM3600d spectrophotometer at a 10° standard observer angle and with a $D_{65}$ illumination. The compositions of Examples 1 and 2 and Comparative Example 3 were compared to the colored standard (Comparative Example 4). As is apparent, Examples 1 and 2 exhibited improved color purity, easily passing the color match test ($\Delta E<1$), while Comparative Example 3 failed.

TABLE 5

| Coating | Dry Film Thickness For Hiding | L* | a* | b* | ΔE |
| --- | --- | --- | --- | --- | --- |
| Example 1 | 2.29 mils | 42.32 | 50.56 | 26.97 | 0.67 |
| Example 2 | 2.32 mils | 42.34 | 50.79 | 27.01 | 0.59 |
| Comparative Example 3 | 2.12 mils | 43.71 | 51.25 | 25.75 | 2.40 |
| Comparative Example 4 | 2.79 mils | 42.24 | 50.80 | 27.59 | — |

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the embodiments described in detail herein are illustrative only and are not limiting to the scope of the invention, which is to be given the full breadth of the appended claims and any and all equivalents thereof.

We claim:

1. A composition, comprising:
  (a) a binder;
  (b) a transparent or semi-transparent colorant comprising particles having an average particle diameter of greater than 150 nanometers; and
  (c) a scattering member comprising a scattering agent selected from air voids and particles dispersed in a matrix.

2. The composition of claim 1, wherein the binder is a polymeric composition.

3. The composition of claim 2, wherein the polymeric composition comprises a thermosetting composition.

4. The composition of claim 3 wherein the thermosetting composition is selected from the group consisting of acrylic resins, aminoplast resins, urethane resins, polyester resins, and epoxy resins and mixtures thereof.

5. The composition of claim 1 wherein the colorant comprises an organic pigment.

6. The composition of claim 5, wherein the transparent or semi-transparent organic pigment is selected from the groups consisting of azo pigments, polycyclic pigments, and mixtures thereof.

7. The composition of claim 5, wherein the transparent or semi-transparent organic pigment has an index of refraction that is greater than or less than that of the binder by an amount less than 0.5 at the wavelength where the greatest difference in index of refraction between the transparent or semi-transparent organic pigment and the binder is observed.

8. The composition of claim 6, wherein the transparent or semi-transparent organic pigment has a color selected from the group consisting of yellow, orange, and red.

9. The composition of claim 1, wherein the transparent or semi-transparent colorant has a haze of 5 up to 55%.

10. The composition of claim 1, wherein the transparent or semi-transparent colorant is present in the composition in an amount of 2 up to 70 percent by weight based on the total weight of the composition.

11. The composition of claim 10, wherein the transparent or semi-transparent colorant is present in the composition in an amount of 2 up to 25 percent by weight based on the total weight of the composition.

12. The composition of claim 1, wherein the scattering member is in the form of a platelet.

13. The composition of claim 12, wherein the platelet has a thickness of between about 0.5 up to about 10 micrometers and a width of between about 10 up to about 150 micrometers.

14. The composition of claim 13, wherein the platelet has a width of between about 20 up to about 30 micrometers.

15. The composition of claim 12, wherein the platelet has an aspect ratio of about 2 up to about 150.

16. The composition of claim 1 wherein the scattering agent is selected from the group consisting of metal oxides, air voids, and mixtures thereof.

17. The composition of claim 16 wherein the metal oxides are selected from the group consisting of titanium dioxide, lead oxide, zinc oxide, and mixtures thereof.

18. The composition of claim 1, wherein the scattering agent comprises particles having an average particle diameter of about 200 up to about 300 nanometers.

19. The composition of claim 1, wherein the scattering agent has an index of refraction that is greater than or less than that of the matrix by an amount of at least 0.5 at the wavelength where the minimum difference in index of refraction between the scattering agent and the matrix is observed.

20. The composition of claim 1, wherein the matrix comprises a polymer.

21. The composition of claim 20, wherein the polymer is selected from the group consisting of acrylic polymers, polyester polymers, polyurethane polymers, and polyether polymers.

22. The composition of claim 1, wherein the matrix is comprises an inorganic material.

23. The composition of claim 22, wherein the matrix is derived from a silica sol.

24. The composition of claim 23, wherein the matrix comprises a glass flake.

25. The composition of claim 23 wherein the scattering agent has an index of refraction that is greater than or less than that of the matrix by an amount of at least 0.5 at the wavelength where the minimum difference in index of refraction between the scattering agent and the matrix is observed.

26. The composition of claim 1, wherein the scattering member further comprises a light absorbing pigment.

27. The composition of claim 1, wherein the scattering member further comprises at least one colorant layer comprising colorant particles.

28. A substrate having the composition of claim 1 deposited thereon.

29. A method of coating a substrate comprising (a) applying a composition to a surface of the substrate to form a substantially continuous film over at least a portion of the substrate, and (b) curing the composition, wherein the composition comprises:
   (1) a binder;
   (2) a transparent or semi-transparent colorant comprising particles having an average particle diameter of greater than 150 nanometers; and
   (3) a scattering member comprising a scattering agent selected from air voids and particles dispersed in a matrix.

30. The method of claim 29 wherein the transparent or semi-transparent colorant comprises an organic pigment.

31. The method of claim 30, wherein the transparent or semi-transparent organic pigment has an index of refraction that is greater than or less than that of the binder by an amount less than 0.5 at the wavelength where the greatest difference in index of refraction between the organic pigment and the binder is observed.

32. The method of claim 30, wherein the transparent or semi-transparent pigment hasa haze of5up to 55%.

33. The method of claim 28, wherein the scattering member is in the form of a platelet.

34. The method of claim 33, wherein the platelet has a thickness of between about 0.5 up to about 10 micrometers and a width of between about 10 up to about 150 micrometers.

35. The method of claim 34, wherein the platelet has a width of between about 20 up to about 30 micrometers.

36. The method of claim 33, wherein the platelet has an aspect ratio of about 2 up to about 150.

37. The method of claim 29, wherein the scattering agent is selected from the group consisting of metal oxides, air voids, and mixtures thereof.

38. The method of claim 37 wherein the metal oxides are selected from the group consisting of titanium dioxide, lead oxide, zinc oxide, and mixtures thereof.

39. The method of claim 29, wherein the scattering agent comprises particles having an average particle diameter of about 200 up to about 300 nanometers.

40. The method of claim 29, wherein the scattering agent has an index of refraction that is greater than or less than that of the matrix by an amount of at least 0.5 at the wavelength where the minimum difference in index of refraction between the scattering agent and the matrix is observed.

41. The method of claim 29, wherein the matrix comprises a polymer.

42. The method of claim 29, wherein the matrix comprises an inorganic material.

43. The method of claim 42, wherein the matrix is derived from a silica sol.

44. The method of claim 43, wherein the matrix comprises a glass flake.

45. The method of claim 29, wherein the scattering member further comprises a light absorbing pigment.

46. The method of claim 29, wherein the scattering member further comprises at least one colorant layer comprising colorant particles.

47. A substrate coated by the method of claim 29.

48. The method of claim 29, wherein the applying step is selected from the group consisting of brushing, spraying, dipping and flowing.

* * * * *